Patented Sept. 13, 1949

2,481,596

UNITED STATES PATENT OFFICE 2,481,596

STABILIZATION OF POLYSULFONE RESINS

Ernest P. Irany, Cranford, N. J., and Herman D. Noether, Kew Gardens, N. Y., assignors to Celanese Corporation of America, a corporation of Delaware No Drawing. Application August 13, 1946, Serial No. 690,327

19 Claims. (Cl. 260—45.8)

This invention relates to polysulfone resins which are formed by reacting an unsaturated olefinic hydrocarbon with sulfur dioxide, and relates more particularly to the preparation of polysulfone resins of improved resistance to heat and capable of being molded satisfactorily at elevated temperatures.

An object of this invention is a novel process for the production of stabilized polysulfone resins adapted to be employed in molding operations and yielding molded articles of a satisfactorily hard and glassy structure.

Another object of this invention is in the provision of molding composition having a basis of a polysulfone resin and containing an organic sulfur compound which compositions are highly resistant to thermal decomposition when exposed to temperatures high enough to render said resinous materials sufficiently fluid for injection molding purposes.

Other objects of this invention will appear from the following detailed description.

The polysulfone resins formed by polymerizing sulfur dioxide with an unsaturated olefinic hydrocarbon or mixture of unsaturated olefinic hydrocarbons are relatively cheap, easily worked and, in addition, have excellent physical properties. However, these polysulfone resins cannot be employed satisfactorily for the production of molded articles because of their instability at the higher temperatures which are necessary in molding operations. While this instability causes some detrimental effects when said polysulfone resins are employed in compression molding operations, it is not sufficient to prevent their use in such molding operations. However, the higher temperatures which are necessary for injection molding operations and the longer periods of time over which the polysulfone resins are exposed to said higher temperatures render the injection molding of said resins quite impossible. When heated to injection molding temperatures sufficient to render the polysulfone resins plastic or fluid, the resins are found to undergo a peculiar form of thermal decomposition. The original glass-like resin expands into a porous, voluminous mass having a puffy structure with the evolution of sulfur dioxide, unsaturated organic compounds and various volatile decomposition products of unpleasant odor. The relative viscosity of a solution of the resulting porous or puffed material is only a small fraction of the viscosity of the resin prior to heating. This characteristic of the polysulfone resins is particularly troublesome due to the fact that the injection molding temperatures of most of said resins are very high. As a consequence, there is either no temperature at which said polysulfone resins can be molded without decomposition or else the available molding temperature range is so limited that it does not afford any possibility of satisfactory commercial operation.

Various so-called stabilizing agents have been suggested as addition compounds to the polysulfone resins. These addition compounds include organic solvent liquids and vapors, acrylic acid esters, vinyl acetate and acylating agents which supposedly act to remove occluded sulfur dioxide. However, these agents contribute a measure of stability to the polysulfone resins only at temperatures at which the polysulfone resins are not plastic and at which they cannot be molded by any practical method. When heated to the elevated temperatures necessary for molding operations, such as 150° C., for example, these stabilizing agents become entirely ineffective and the polysulfone resins containing them are substantially as unstable as in their absence.

We have now found that polysulfone resins which are formed by reacting sulfur dioxide with an unsaturated olefinic hydrocarbon or mixture of unsaturated olefinic hydrocarbons may be stabilized and rendered highly resistant to thermal decomposition if an organic compound containing at least one sulfhydryl group, i. e. —SH, is incorporated therein as a stabilizing agent. The addition of an organic sulfhydryl compound to a polysulfone resin yields polysulfone resin compositions which are capable of withstanding severe molding conditions without undergoing any thermal decomposition. As a consequence, said modified, and stabilized polysulfone resins may be employed very satisfactorily for injection molding operations, a use for which they were entirely unsuited prior to our invention.

Among the organic compounds containing a sulfhydryl which may be employed in accordance with our invention are alkyl, aryl, aralkyl and heterocyclic compounds containing the sulfhydryl group in the nucleus, said sulfhydryl group being present alone or together with various other functional groups. As examples of the particular organic sulfhydryl compounds which we have found to be particularly valuable are benzyl mercaptan, thiophenol, octyl mercaptan, dodecyl mercaptan, as well as various other long and short chain alkyl mercaptans, mercapto ethanol, di-thio ethylene glycol, mono-thio glycerine, di-thio glycerine and tri-thio glycerine, thio-glycollic acid, mercapto ethyl acetate and mercapto-benzo-thiazole. In order to effect the desired degree of stabilization, we preferably incorporate from 0.5 to 5%, based on the weight of the polysulfone resin, of the desired organic sulfhydryl compound in the molding composition employed.

The sulfhydryl stabilizing agents may be incorporated in the polysulfone resin in a number of ways. Thus, for example, the stabilizer may be added to the finely powdered or precipitated polysulfone resin by distributing the desired quantity evenly thereon by means of a suitable mixing device. For more even distribution throughout the polysulfone resin, the stabilizer may be dissolved in a low boiling organic liquid which is a solvent for the sulfhydryl compound but which is neither a solvent nor swelling agent for the resin, and the solution obtained thoroughly mixed with the powdered or precipitated resin followed by evaporation of the volatile carrier, preferably at an elevated temperature and/or under reduced pressure. As suitable solvent carriers for the sulfhydryl compound there may be mentioned ethyl ether, methanol or benzene. Furthermore, the sulfhydryl stabilizing agent may be dissolved in the solution of the polysulfone resin in which the latter has been prepared and both the resin and stabilizing agent separated therefrom simultaneously. Emulsions of the sulfhydryl stabilizing agent may also be prepared and then mixed with the polysulfone resin. Various other suitable methods of incorporating the stabilizing agent in the polysulfone resin may also be employed, as are well known in the art.

In order further to illustrate our invention, but without being limited thereto, the following examples are given:

Example I 1300 parts by weight of a powdered polysulfone resin prepared by polymerizing butene-2 and sulfur dioxide are mixed with a solution of 150 parts by weight of mercapto ethanol dissolved in 1200 parts by weight of benzene and mixing is continued until as uniform a distribution of the mercapto ethanol as possible has been obtained. The mixture is then dried at a temperature of about 80 to 85° C. under a vacuum of 26 to 27 inches of mercury so that all of the benzene and a portion of the mercapto ethanol is removed, leaving thereon about 3 to 4% on the weight of the polysulfone resin of mercapto ethanol. The resulting polysulfone resin composition may then be injection molded at temperatures of 215 to 235° C. without any thermal decomposition taking place. Unstabilized butene-2 polysulfone resin, however, decomposes rapidly in the injection cylinder at a temperature of about 165 to 175° C. which temperature is insufficient to provide an adequate flow of said resin for injection molding purposes.

Example II

A solution of 150 parts by weight of mercapto ethanol in 1200 parts by weight of benzene is mixed with a powdered polysulfone resin prepared from butene-2 and sulfur dioxide and the butene and a part of the mercapto ethanol removed therefrom by drying under vacuum as described in Example I, leaving thereon 1% by weight on the resin of mercapto ethanol. The resulting polysulfone resin melts without decomposition at 220° C. while the untreated butene-2 polysulfone resin decomposes without sintering at a temperature of 165 to 175° C. and forms a voluminous spongy mass with the evolution of sulfur dioxide, olefines and other volatile products.

Example III

To 100 parts by weight of polysulfone resin prepared by copolymerizing a mixture of 3 parts by weight of propylene, 2 parts by weight of butene-2 and 1 part by weight of butene-1 with excess sulfur dioxide are added 12 parts by weight of mercapto ethanol dissolved in 120 parts by weight of benzene. The resulting slurry is thoroughly mixed and then dried as described in Example I leaving thereon about 5% on the weight of the resin of mercapto ethanol. The resulting stabilized polysulfone resin composition can be injection molded at a temperature of about 200° C. with the production of useful molded products while the unstabilized polysulfone resin decomposes when attempts are made to injection mold it at said temperature.

Example IV 100 parts by weight of a butene-2 polysulfone resin in a porous precipitated form is mixed with 1% by weight of thio-glycollic acid dissolved in ethyl ether. The ethyl ether is evaporated off under reduced pressure at a temperature of 50° C. The stabilized polysulfone resin obtained can be compression molded at 165° C. to give transparent moldings and can be injection molded at a temperature of 210° C. The unstabilized resin begins to decompose at a temperature of about 165° C. and expands into a spongy white mass with the evolution of volatile decomposition products when heating is continued.

Example V

1% by weight, based on the polysulfone resin, of thio-glycollic acid dissolved in ether are mixed with the polysulfone resin described in Example III and the ether then evaporated therefrom under reduced pressure at 50° C. The polysulfone molding composition obtained is thermally stable at a temperature of 205° C. while the unstabilized polysulfone resin decomposes rapidly at a temperature of 175° C.

Example VI

A solution of benzyl mercaptan in benzene is mixed with a sufficient quantity of a powdered polysulfone resin prepared by polymerizing butene-2 with sulfur dioxide to yield a resin composition containing 3% by weight of benzyl mercaptan after the benzene has been evaporated therefrom. The butene-2 polysulfone resin composition obtained is quite resistant to decomposition at a temperature of 200° C. while the unstabilized resin decomposes rapidly at temperatures even below 170° C.

Example VII

A stabilized butene-2 polysulfone resin is prepared in accordance with the treatment described in Example VI employing 1% by weight of mercapto ethyl acetate applied in ether solution as the stabilizing agent. The removal of the ether is effected under reduced pressure. The stabilized polysulfone resin is quite stable at a temperature of 205° C. while untreated resin begins to decompose between 165 and 170° C.

It is to be understood that the foregoing detailed description is given merely by way of illustration and that many variations may be made therein without departing from the spirit of our invention.

Having described our invention, what we desire to secure by Letters Patent is:

1. In a process for the stabilization of polysulfone resins formed by reacting an unsaturated olefinic hydrocarbon containing 3 to 4 carbon atoms with sulfur dioxide whereby said polysulfone resins are rendered highly resistant to thermal decomposition, the step which comprises incorporating an organic compound containing at least one sulfhydryl group with said polysulfone resin as a stabilizing agent therefor.

2. In a process for the stabilization of polysulfone resins formed by reacting an unsaturated olefinic hydrocarbon containing 3 to 4 carbon atoms with sulfur dioxide whereby said polysulfone resins are rendered highly resistant to thermal decomposition, the step which comprises incorporating an alkylene compound containing at least one sulfhydryl group with said polysulfone resin as a stabilizing agent therefor.

3. In a process for the stabilization of polysulfone resins formed by reacting an unsaturated olefinic hydrocarbon containing 3 to 4 carbon atoms with sulfur dioxide whereby said polysulfone resins are rendered highly resistant to thermal decomposition, the step which comprises incorporating an aryl compound containing at least one sulfhydryl group with said polysulfone resin as a stabilizing agent therefor.

4. In a process for the stabilization of polysulfone resins formed by reacting an unsaturated olefinic hydrocarbon containing 3 to 4 carbon atoms with sulfur dioxide whereby said polysulfone resins are rendered highly resistant to thermal decomposition, the step which comprises incorporating a heterocyclic compound containing at least one sulfhydryl group with said polysulfone resin as a stabilizing agent therefor.

5. In a process for the stabilization of polysulfone resins formed by reacting an unsaturated olefinic hydrocarbon containing 3 to 4 carbon atoms with sulfur dioxide whereby said polysulfone resins are rendered highly resistant to thermal decomposition, the step which comprises incorporating thio-glycollic acid with said polysulfone resin as a stabilizing agent therefor.

6. In a process for the stabilization of polysulfone resins formed by reacting an unsaturated olefinic hydrocarbon containing 3 to 4 carbon atoms with sulfur dioxide whereby said polysulfone resins are rendered highly resistant to thermal decomposition, the step which comprises incorporating benzyl mercaptan with said polysulfone resin as a stabilizing agent therefor.

7. In a process for the stabilization of polysulfone resins formed by reacting an unsaturated olefinic hydrocarbon containing 3 to 4 carbon atoms with sulfur dioxide whereby said polysulfone resins are rendered highly resistant to thermal decomposition, the step which comprises incorporating from 0.5 to 5% by weight of an organic compound containing at least one sulfhydryl group with said polysulfone resin as a stabilizing agent therefor.

8. In a process for the stabilization of polysulfone resins formed by reacting an unsaturated olefinic hydrocarbon containing 3 to 4 carbon atoms with sulfur dioxide whereby said polysulfone resins are rendered highly resistant to thermal decomposition, the step which comprises incorporating from 0.5 to 5% by weight of an alkylene compound containing at least one sulfhydryl group with said polysulfone resin as a stabilizing agent therefor.

9. In a process for the stabilization of polysulfone resins formed by reacting an unsaturated olefinic hydrocarbon containing 3 to 4 carbon atoms with sulfur dioxide whereby said polysulfone resins are rendered highly resistant to thermal decomposition, the step which comprises incorporating from 0.5 to 5% by weight of an aryl compound containing at least one sulfhydryl group with said polysulfone resin as a stabilizing agent therefor.

10. In a process for the stabilization of polysulfone resins formed by reacting an unsaturated olefinic hydrocarbon containing 3 to 4 carbon atoms with sulfur dioxide whereby said polysulfone resins are rendered highly resistant to thermal decomposition, the step which comprises incorporating from 0.5 to 5% by weight of heterocyclic compound containing at least one sulfhydryl group with said polysulfone resin as a stabilizing agent therefor.

11. In a process for the stabilization of polysulfone resins formed by reacting butene-2 with sulfur dioxide whereby said resins are rendered highly resistant to thermal decomposition, the step which comprises incorporating an organic compound containing at least one sulfhydryl group with said polysulfone resin as a stabilizing agent therefor.

12. In a process for the stabilization of polysulfone resins formed by reacting a mixture of propylene, butene-2 and butene-1 with sulfur dioxide whereby said resins are rendered highly resistant to thermal decomposition, the step which comprises incorporating an organic compound containing at least one sulfhydryl group with said polysulfone resin as a stabilizing agent therefor.

13. In a process for the stabilization of polysulfone resins formed by reacting butene-2 with sulfur dioxide whereby said resins are rendered highly resistant to thermal decomposition, the step which comprises incorporating from 0.5 to 5% by weight of an organic compound containing at least one sulfhydryl group with said polysulfone resin as a stabilizing agent therefor.

14. In a process for the stabilization of polysulfone resins formed by reacting a mixture of propylene, butene-2 and butene-1 with sulfur dioxide whereby said resins are rendered highly resistant to thermal decomposition, the step which comprises incorporating from 0.5 to 5% by weight of an organic compound containing at least one sulfhydryl group with said polysulfone resin as a stabilizing agent therefor.

15. A stabilized polysulfone resin composition comprising the resinous reaction product obtained on reaction of an unsaturated olefinic hydrocarbon containing 3 to 4 carbon atoms with sulfur dioxide having an organic compound containing at least one sulfhydryl group incorporated therewith as a stabilizing agent.

16. A stabilized polysulfone resin composition comprising the resinous reaction product obtained on reaction of an unsaturated olefinic hydrocarbon containing 3 to 4 carbon atoms with sulfur dioxide having an alkylene compound containing at least one sulfhydryl group incorporated therewith as a stabilizing agent.

17. A stabilized polysulfone resin composition comprising the resinous reaction product obtained on reaction of an unsaturated olefinic hydrocarbon containing 3 to 4 carbon atoms with sulfur dioxide having an aryl compound containing at least one sulfhydryl group incorporated therewith as a stabilizing agent.

18. A stabilized polysulfone resin composition comprising the resinous reaction product obtained on reaction of an unsaturated olefinic hydrocarbon containing 3 to 4 carbon atoms with sulfur dioxide having a heterocyclic compound containing at least one sulfhydryl group incorporated therewith as a stabilizing agent.

19. A stabilized polysulfone resin composition comprising the resinous reaction product obtained on reaction of an unsaturated olefinic hydrocarbon containing 3 to 4 carbon atoms with sulfur dioxide having from 0.5 to 5% by weight of an organic compound containing at least one sulfhydryl group incorporated therewith as a stabilizing agent.

ERNEST P. IRANY.
HERMAN D. NOETHER.

REFERENCES CITED

The following references are of record in the file of this patent:

UNITED STATES PATENTS

| Number | Name | Date |
|---|---|---|
| 2,416,061 | McAlevy | Feb. 18, 1947 |

OTHER REFERENCES

Marvel, Jour. Org. Chem., vol. 9, pp. 113–116 (1944).